Figure 6:
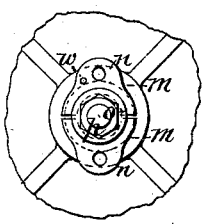

(No Model.) 2 Sheets—Sheet 1.

C. E. EMERY.
ELECTRIC MOTOR FOR RAILWAY CARS.

No. 538,104. Patented Apr. 23, 1895.

Witnesses, Inventor,

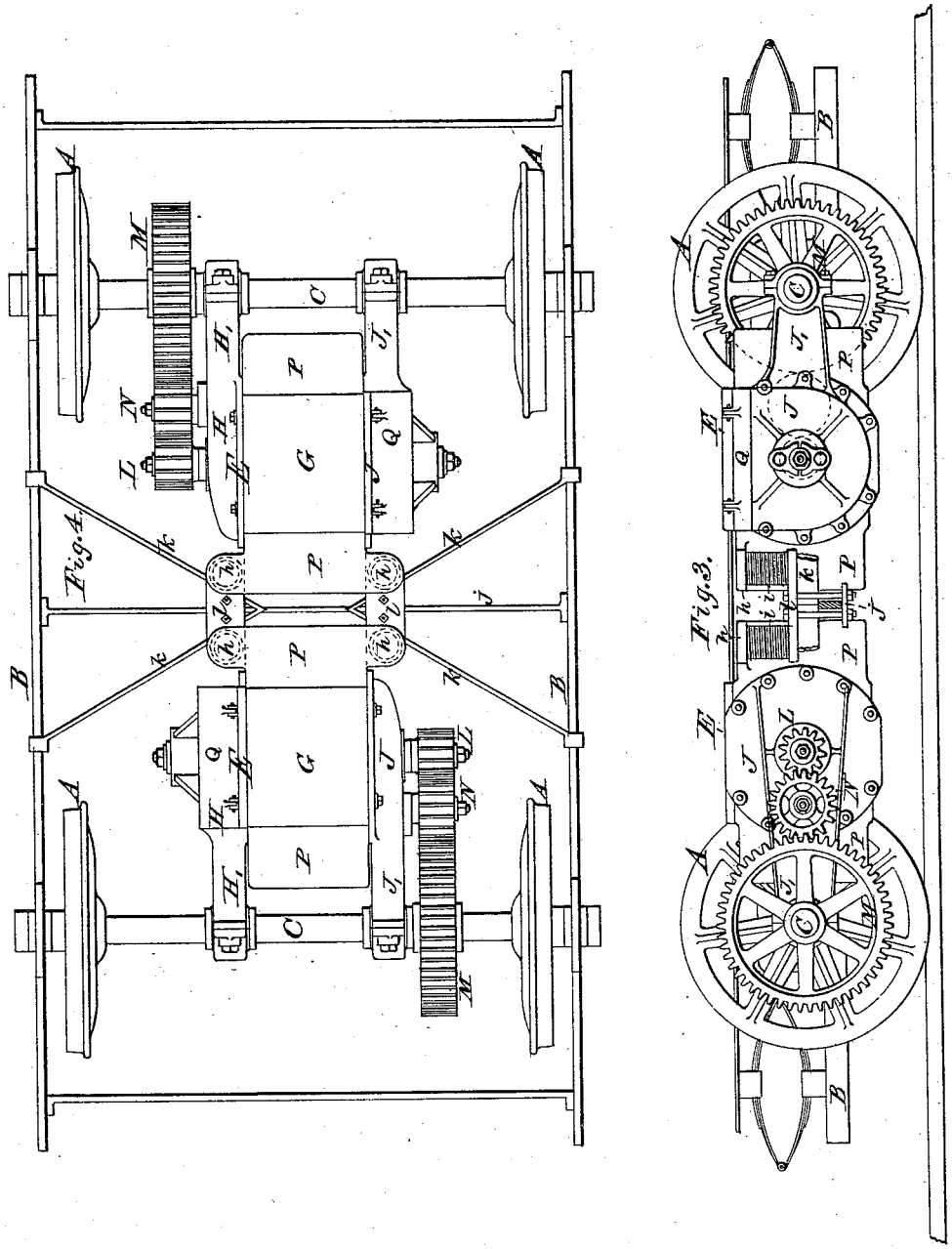

UNITED STATES PATENT OFFICE.

CHARLES E. EMERY, OF BROOKLYN, NEW YORK.

ELECTRIC MOTOR FOR RAILWAY-CARS.

SPECIFICATION forming part of Letters Patent No. 538,104, dated April 23, 1895.

Application filed April 19, 1894. Serial No. 508,096. (No model.)

*To all whom it may concern:*

Be it known that I, CHARLES E. EMERY, residing in Brooklyn, county of Kings, and State of New York, (office, New York city,) have made certain new and useful Improvements in Electric Motors for Railway-Cars; and I do hereby declare that the following is a full, clear, and exact description of the same, reference being had to the accompanying drawings, making part of this specification.

The most general practice now obtaining in the construction of cars for electric street railways is to connect a motor to each axle by means of a pinion on the armature shaft of the motor operating directly a spur wheel on the axle. This system is called the "single reduction" system. With this construction the speed of the gearing is so much reduced, compared with that of double geared or "double reduction" motors formerly in vogue, that the toothed wheels operate quite satisfactorily and are reasonably enduring. The change has, however, required the use of heavier motors of slower speed. A greater weight is carried directly by the axle without the intervention of springs, and the pounding action of the wheels is thereby greatly increased. The system, moreover, requires generally the use of motors of special design, particularly as to the arrangement of the field magnets, so that the armature shaft may be brought sufficiently near the car axle to permit the use of the single reduction system without increasing any of the diameters so much as to cause portions of the apparatus to touch obstructions on the ground below the motors or portions of the car above the same. With the old double reduction motors the field magnets could be laid horizontally, and the space required vertically was small so that the car bodies could be lower and not require the high steps now necessary for cars with single reduction motors.

One object of this invention is to provide means whereby the advantages of the slow motion of the armature and its pinion can be obtained in connection with the advantages due to arranging field magnets of ample size horizontally, so as not to greatly increase the vertical measurements, and whereby, moreover, the weights may be so distributed as to reduce the load carried directly on the axle without the intervention of springs. This result is accomplished by bringing the motor nearer the center of the car and transmitting the motion from the pinion on the armature shaft to the spur wheel on the car axle through an intermediate gear engaging with the teeth of both the driver and follower, and called by Willis an "idle" gear.

The further object of the invention is to provide details of construction adapted to utilize the above feature, some of which are equally available for use in other combinations. When a motor is provided for each axle, the intermediate gear is generally made comparatively small in diameter to shorten the motors so that two can lie in the space available, but when only one motor is employed it is connected through an intermediate gear of larger diameter with one axle only. The motor is carried nearer the center of the car and all the axles of the car or truck are preferably connected by side rods such as are commonly used on locomotives. It will be observed that the intermediate gear does not change the ratio of reduction from the pinion on armature shaft to the driven wheel on axle so that the motor may still be called a single reduction motor, the intermediate gear wheel being applied merely to secure the advantages above referred to.

Figure 5:
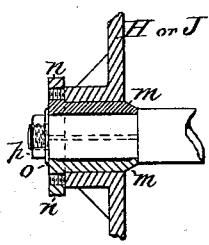
Figure 7:
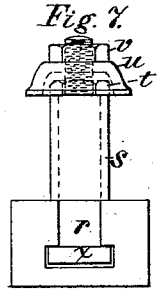
Figure 2:
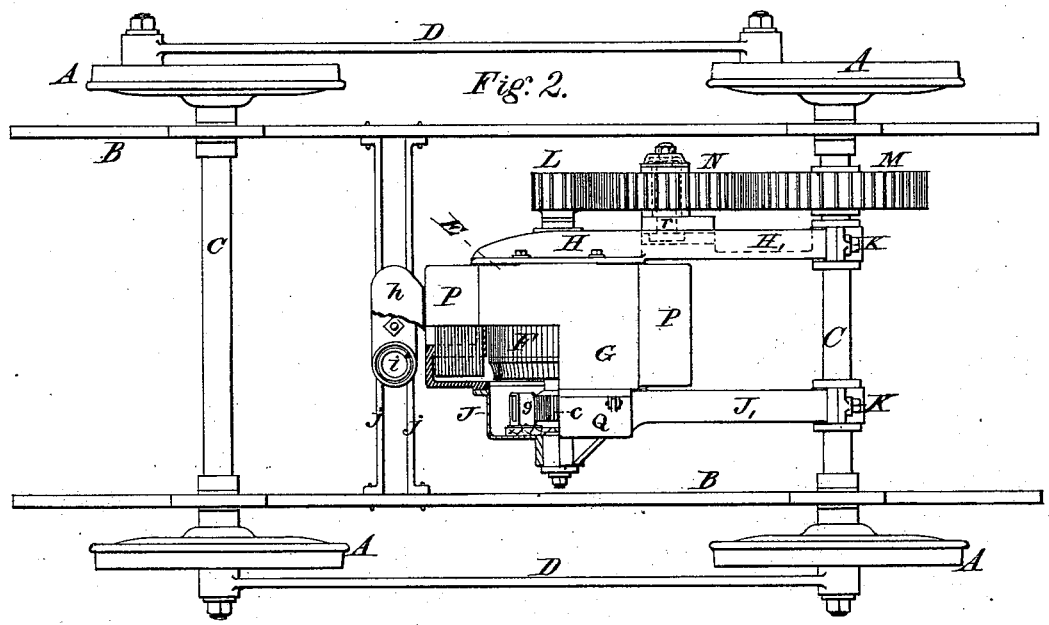
Figure 1:
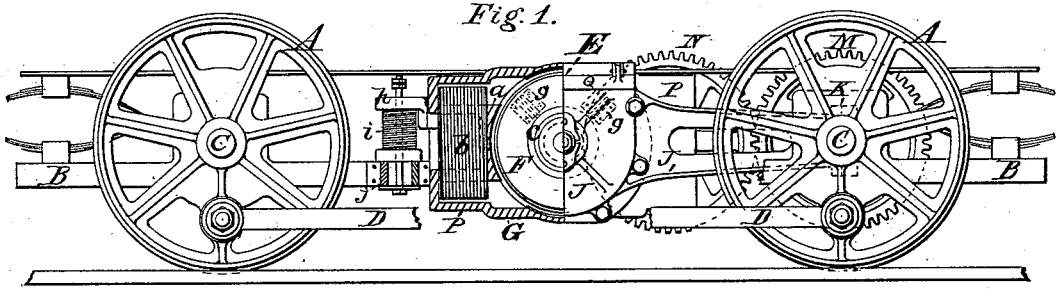

In the drawings, Figure 1 represents a side elevation of a car truck with four wheels connected by side rods and provided with a single electric motor connected to one of the axles. Part of the motor is in section to show the construction and fragments of the truck frame and side rods are removed for clearness of illustration. Fig. 2 is a plan of the same. Fig. 3 is a side elevation of a four-wheel truck with an electric motor connected to each axle, the frame of the truck and the car wheels facing the observer being removed for clearness of illustration. Fig. 4 is a more complete plan view of the truck with motors in place. Fig. 5 is a vertical cross section of one of the bearings of the armature shaft. Fig. 6 is a vertical exterior elevation of the same. Fig. 7 is a top view of the stud on which the intermediate gear is journaled.

The same letters in all the figures refer to corresponding parts.

A are the car wheels, B the truck frames, and C the car axles.

The single motor truck shown in Figs. 1 and 2 is preferably constructed with the axle bearings inside the wheels, as shown, and the wheels at opposite ends of each axle are preferably provided with crank pins set at right angles and such pins on the two axles connected by side rods D, D, as in locomotive practice.

E is an electric motor provided preferably with polar projections, P, and internal pole pieces, $a$, at each end, and connecting yoke pieces, all forming part of an external case G, preferably made integral or in one piece and entirely closed in, except that in one or both sides an opening is left of sufficient size to permit the introduction and removal of the armature F. The yoke at top and bottom may be left well clear of the armature, when the pole pieces at each end will be so excited by field coils $b$ as to be of opposite polarity and the motor be bipolar, or, as shown, the yokes of the field may be drawn in at the top and bottom in the form of supplementary pole pieces, in which case the field will be so excited that the horizontal poles will be of like polarity and "consequent" poles of opposite polarity to the horizontal ones be formed in the pole pieces at the top and bottom.

F is the armature, $c$ the commutator, and $g, g$, brush holders carrying brushes to bear on the commutator. Preferably the main central section or yoke piece G of the motor entirely incloses the field coils at each end, and the yoke is at each side finished with a circular fitting piece which receives a frame, H, at one end and a frame J at the other, each formed with a plate to cover one end of the motor and carrying at the center a bearing to support a journal of the armature shaft. The frames H and J are provided with lateral extensions H' and J' constructed at their ends with bearings K engaging with a car axle C.

L is a pinion on the end of the armature shaft and M a spur wheel on the car axle. The distance between the axle and armature shaft is made such that the principal weight of the motor is near the center of the car and the pinion L and wheel M are connected by means of an intermediate gear N meshing into each of the others and carried on a stud $r$ secured in the frame H. Brackets $h$ are attached to the motor and serve to support the rear end of the motor through springs $i$ resting on suitable plates on cross-bars $j, j$, secured to the frame B of the truck. It will be seen that by this method of construction an armature of desirable size may be obtained with a minimum depth of motor and that the polar extensions P, P, may be made of any desired length without interfering with other parts. Again, the center of weight of the motor may be so far removed from the axle to which the motor is connected that a moderate portion of the weight will be carried upon such axles direct without intervening springs.

In Figs. 3 and 4, where a motor is connected to each car axle, the sides of the truck frame may, as shown, carry the bearings outside the wheels, as is more customary, though there is no objection to using the inside frames and side rods in this case.

The description of the motor previously given applies equally well to the motors shown in Figs. 3 and 4, except that the lugs $h$ on the motor to carry the weights of the rears of the motors on springs $i$ are for the particular proportions shown located at the sides of the polar extensions P instead of at the rear. The springs are supported on a cross-bar $j$, supplemented in the particular arrangement shown by tri-angular braces $k$ supporting plates $l$ for receiving the springs.

It will be observed that the lateral extensions H' and J' of the motors shown in Figs. 3 and 4 are shorter than those shown in Figs. 1 and 2, so that there will be room for two motors in the distance between the car axles, and the pinions L and M are connected by an intermediate gear N, meshing in both, of smaller diameter than that shown in Figs. 1 and 2. The advantages of this system when applied to two motors are of the same nature as if only one motor is used. It is, however, not practicable with two motors to throw as large a proportion of weight off the car axle direct as if only one is employed.

The construction of the field yoke in one piece with openings at one or both ends to receive the parts of frames H and J which form covers thereto has the disadvantage that the armature cannot be removed as quickly as if the yoke were divided or had its top and the pole pieces removable, but this arrangement can be made lighter than any divided system, and, moreover, the permeability of the yokes is not reduced by joints. In general, an armature can best be removed with the motor out of the truck, which can readily be done by running the truck from under the car or by an elevator in a pit under the car at the repair house, and in these days it is a small matter to lift the motor off the truck or out of the pit and turn it on its side with a derrick, which can be used also to lift out and replace an armature when one of the covers has been removed.

As shown in Figs. 1 and 2, the frame J at the point where it covers the end of the central section G is made in the form of a chamber, as shown, to inclose and protect the commutator and brushes, access to which is obtained through a cover Q.

As it is necessary that an armature run approximately concentric with the bore of the pole pieces, no considerable adjustment by means of half boxes on the journals of the armature shaft is practicable, and solid boxes are used very freely but are clamped in place by a cap, the same as if such boxes were adjustable. In order to avoid the use of a cap the bearings of the armature shaft are peculiarly constructed, as shown in Figs. 5 and 6. The upper and lower boxes $m$, $m$, may be made of brass or of cast iron babbitted, made originally in one piece and split at the sides. The boxes are supported in a simple parallel hole in the frames H and J, being made so that their exteriors fit fairly therein. Since it is necessary that the armature journals run a little free in the boxes, the fact that the boxes are made in parts causes the exterior of the boxes to be to the same extent loose in the supporting openings in the frames, and it is possible to pull out a half box longitudinally without removing a cap over it. For convenience in doing this each is provided with a lug $n$, in which is a threaded hole in which a long set screw or backing off bolt may be screwed and force out the box. The half boxes $m$ are prevented from turning by a longitudinal pin $w$ or equivalent. Such half boxes may be held in place longitudinally in any customary way by attachment to the frame or otherwise. As shown, the collar formed by the pinion L prevents motion of the shaft in one direction and on the other end of the shaft a collar $o$ secured by a nut $p$ or equivalent prevents motion in the other direction.

To permit a change of the position of the stud upon which the intermediate gear N is mounted, I prefer to use the arrangement shown in Fig. 7, in which the stud proper, designated $r$, is provided with a head $x$ engaging in a slot shown in Fig. 7 and in dotted lines in Fig. 2. Surrounding the stud $r$ is the sleeve $s$, and a thin nut $t$ is provided to draw the collar $s$ on the stud $r$ up to a bearing on the frame by pressure on the end of the sleeve $s$. $u$ is a hollow washer covering the nut $t$, with its inner edge faced off to form a collar for the intermediate gear N and is held in place by an external nut $v$. The benefit of this arrangement is that when it is not possible to fasten the stud $r$ in place in the casting from the inside, it can be set carefully at the required point and clamped by means of the nut $t$, which is made of such small diameter that the journal in the wheel N will slip over it when the collar $u$ and nut $v$ are removed, which construction enables the wheel N to be renewed without changing the position of the stud.

What I claim as my invention, and desire to secure by Letters Patent, is—

1. In combination with a car axle and with an electric motor supported at one end on such axle and adapted for use under a car by arranging the armature shaft at substantially the same elevation as the car axle, an intermediate idle gear for transmitting motion from a pinion on the armature shaft to a spur gear on the car axle, the three gears being all supported by suitable framing, journals and bearings in a continuously fixed relation one to the other, substantially as and for the purposes specified.

2. In combination with a car axle and an iron-clad electric motor, with field magnets extended horizontally and armature shaft arranged, substantially at the same height as such car axle to adapt such motor for use under a car, an intermediate idle gear for transmitting motion from a pinion on the armature shaft to a spur gear on the car axle, thus permitting the use of a field magnet of ample length, substantially as and for the purposes specified.

3. In the construction of an electric car motor, an integral yoke section provided with internally arranged field magnets and side openings in combination with frames adapted to close such openings and provided with armature and car axle bearings, substantially as and for the purposes specified.

4. In the construction of an electric motor, in combination with a central section forming the main magnetic circuit exterior to the armature and provided with a side opening to admit the armature, a side frame adapted to close such opening and provided with means to support an armature bearing and a bearing engaging with the car axle, substantially as and for the purposes specified.

5. In combination with a car truck provided with axles connected by side rods and in combination with an electric motor supported at one end on one of said axles and constructed with horizontal field magnets, and with the armature shaft at substantially the same elevation as such car axle, an intermediate idle gear for connecting a pinion on the armature shaft with a spur gear on the car axle, substantially as and for the purposes specified.

6. In combination with an electric motor, adapted for use under a car by arranging the field magnets horizontally and the armature axle substantially at the same elevation as the car axle, and in combination with an intermediate idle gear to connect a pinion on the armature axle with a spur gear on the car axle, adapted to increase the distance between the armature shaft and the car axle to permit the location of the field magnets horizontally, suitable cranks, crank pins and side rods operating to connect the driven axle with the other axle of a truck, substantially as and for the purposes specified.

7. In combination with an electric motor provided with a side opening, a frame adapted to close such opening constructed in the form of a chamber to inclose the side of the motor and the armature and brushes; provided also with a bearing for the armature shaft, and with an arm to assist in the attachment of the motor to a point of support, substantially as and for the purposes specified.

8. In combination with the end of an electric motor provided with a non-adjustable central opening, an armature bearing consisting of two half boxes fitting such opening externally and with running freedom for the shaft internally, each provided with a lug and threaded hole to receive a backing-off bolt, substantially as and for the purposes specified.

CHAS. E. EMERY.

Witnesses:
FRANK L. ZABRISKIE,
J. A. RUOFF.